United States Patent [19]

Koike

[11] Patent Number: 4,862,444

[45] Date of Patent: Aug. 29, 1989

[54] INDEX CARRIER FOR INDEXING AND REPRODUCING A PLURALITY OF RECORD DISCS AND A SIMPLIFIED SOUND REPRODUCING DEVICE INCORPORATING THEREOF

[75] Inventor: Eishi Koike, Sagamihara, Japan

[73] Assignee: Ozen Corporation, Tokyo, Japan

[21] Appl. No.: 78,660

[22] Filed: Jul. 28, 1987

[30] Foreign Application Priority Data

Jul. 31, 1986 [JP] Japan .................. 61-180756

[51] Int. Cl.[4] .................. G11B 25/04; G11B 3/40; G11B 3/4
[52] U.S. Cl. .................................. 369/67; 369/177
[58] Field of Search .................. 369/63, 67, 68, 177; 353/19

[56] References Cited

U.S. PATENT DOCUMENTS

| | | | |
|---|---|---|---|
| 2,486,662 | 11/1949 | Leitner | 369/177 |
| 3,083,485 | 4/1963 | Wagenseil | 353/19 |
| 3,435,156 | 3/1969 | Schwartz et al. | 353/19 |
| 3,883,146 | 5/1975 | Johnson et al. | 369/177 |
| 3,886,671 | 6/1975 | Liu | 369/177 |
| 3,917,284 | 11/1975 | Doring | 369/177 |
| 4,123,065 | 10/1978 | Watanabe | 369/63 |
| 4,648,086 | 3/1987 | Koike | 369/63 |

FOREIGN PATENT DOCUMENTS 1422038 10/1968 Fed. Rep. of Germany ...... 369/177

Primary Examiner—Steven L. Stephan
Attorney, Agent, or Firm—Arnold S. Weintraub; Gerald R. Black

[57] ABSTRACT

As an effective means for carrying a plurality of record discs for selective reproduction, comprising an index carrier which is formed mainly as an index proper of flexible or rigid lengthy plate or as a series of plates connected with hinges, the periphery of the index proper having notches acting as indexing points for fixing and indexing the desired record disc and the side periphery or peripheries acting to restrain and guide the index carrier in a specific and regular direction. A simplified sound reproducing device for using aforesaid index carrier is constructed, in addition to ordinary means such as a tone arm, a turn table, a record disc, a sound transmitting member, starting and terminating means and the like, to have an index carrier magazine composed of a pair of magazines each disposed at each transverse side of the casing and having several means such as a spool, a knob or the like, for feeding the index carrier to the position where it can engage the reproducing stylus of the tone arm.

6 Claims, 5 Drawing Sheets

INDEX CARRIER FOR INDEXING AND REPRODUCING A PLURALITY OF RECORD DISCS AND A SIMPLIFIED SOUND REPRODUCING DEVICE INCORPORATING THEREOF

BACKGROUND OF THE INVENTION

1. Field of the Invention:

This invention relates to an index carrier for indexing and reproducing a plurality of record discs and a simplified sound reproducing device incorporated therein such an index carrier, and more particularly, to an index carrier comprising a carrier proper having a plurality of indexing points at appropriate positions and carrying the same number of record discs corresponding to the indexing points and a restraining portion for restraining the carrier proper so as to transfer the carrier proper to a specific direction in a regular manner: and to a simplified sound reproducing device for indexing and reproducing the plural number of record discs comprising, a track or tracks disposed in the casing for leading the restraining portion of the index carrier proper so as to index and transfer the selected record disc to a position facing with the turn table of the reproducing device, an index carrier magazine disposed contiguous to the track or tracks, and a locking member for indexing and fixedly locking the record disc to the above-mentioned position facing with the turn table.

By virtue of the provision of the index carrier as well as the sound reproducing device, any portion of a specific record disc can be indexed for playing and then reproduced out of the number of record discs carried in the index carrier.

Prior Art:

There have been provided several simplified sound reproducing devices capable of exchanging and playing a plurality of record discs [refer, for example, to Japanese Patent Examined Publication Nos. Sho 57 (1982)-31201 and Sho 57 (1982)-00589].

Each of these simplified sound reproducing devices comprises a tone arm having an upwardly projecting sound reproduction stylus directed to the turn table capable of being advanced or retracted so that the reproduction stylus can engage the recorded face of a record disc loaded or mounted on the turn table so as to let the reproduction stylus engage with or disengage from the recorded face.

However, according to the record discs or simplified sound reproducing device of the prior art type, the record discs are kept or handled separately and the reproducing device must be loaded or mounted with the record disc of the selected item per each sheet through cumbersome operations. Accordingly, there have been various demands for obtaining such a device capable of mechanically indexing a plurality of record discs and promptly reproducing the desired item, and there have also remained drawbacks that such prior art devices were difficult to operate.

SUMMARY OF THE INVENTION

In order to solve the problems mentioned above, the present invention provides as a main invention, an index carrier for indexing and reproducing a desired item of a plurality of record discs, which index carrier comprises, a carrier proper formed with a plurality of indexing points, a plurality of record discs corresponding in number and position to the indexing points, and a restraining or limiting portion which acts to move the carrier proper in a specific regular direction.

The above mentioned simplified sound reproducing device is a simplified sound reproducing device, which comprises: a casing; a record disc disposed in said casing with its recorded face being directed toward the interior of said casing; a turn table and a tone arm having a sound reproducing stylus projecting toward said recorded face of said record disc and arranged rotatably between the starting point and the end point of sound reproduction of said record disc being urged by a return spring toward the starting point of the sound reproduction and further urged by a stylus force spring in an axial direction; a sound transmitting member being contacted with a speaker diaphragm mounted in said turn table and with said tone arm acting to transmit the reproduction vibration of said tone arm to said speaker diaphragm; a reproduction terminating means for retracting said turn table against the stylus force spring; a starting means for advancing said turn table by said stylus force spring; an electric motor for driving said turn table; and an electrical contact for supplying electricity to said electric motor when actuated by said starting means and cutting off the electricity when actuated by said reproduction terminating means.

The plurality of record discs are incorporated in an index carrier which consists of a carrier proper, a plurality of index points formed at suitable points of said index carrier corresponding to said record discs and a guiding or restraining portion for guiding said carrier proper in a specified regular direction. The casing comprises a track or tracks for guiding said restraining means for the purpose of indexing and guiding said record discs to the position where said record disc can be confronted with said turn table, an index carrier magazine formed contiguous to said track, and a locking member to be engaged with said index point for indexing and locking said record disc to said position where said record disc can be confronted with said turn table.

According to these inventions, an index carrier magazine of a simplified sound reproducing device is loaded with an index carrier incorporating therein a plurality of record discs. A restricting portion of the index carrier is guided for the purpose of moving the index carrier and the desired recorded disc can be indexed and reproduced by the sound reproducing device.

BRIEF DESCRIPTION OF THE DRAWINGS

FIG. 4 is a partial plan view showing the relationship between the index carrier, a turn table, a cancelling means, a terminating means, a bar, a locking member, and an electric contact or the like;

DETAILED DESCRIPTION OF THE PREFERRED EMBODIMENTS

Figure 1:
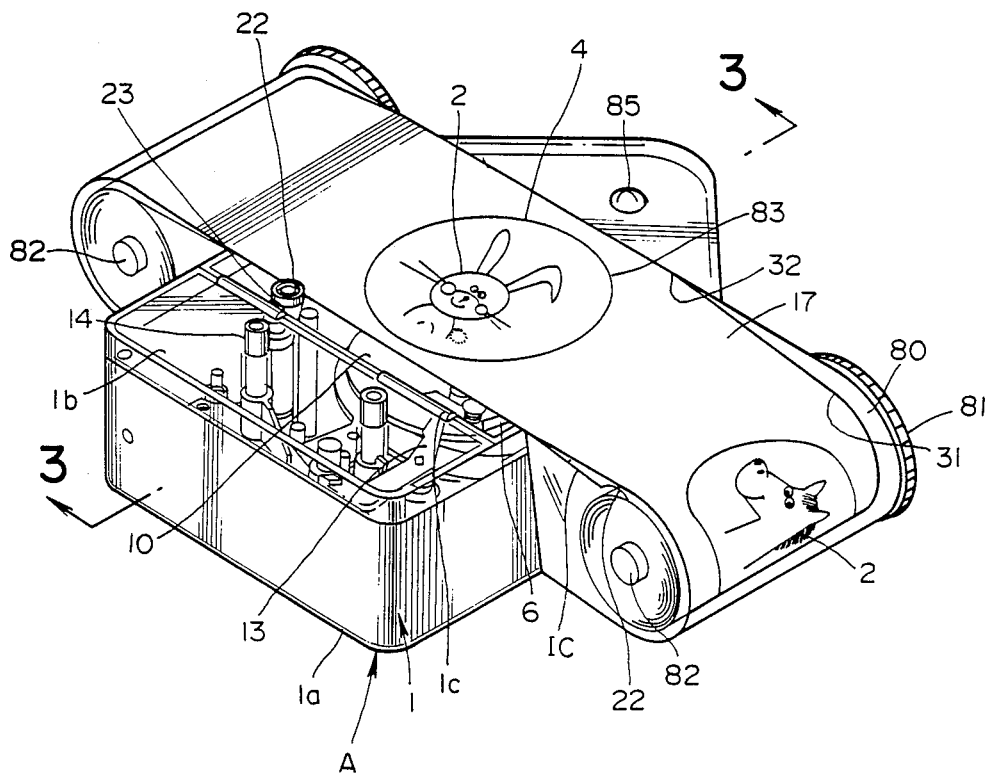
FIG. 1 is a perspective view of a preferred embodiment of an index carrier and a simplified sound reproducing device using the index carrier.
Figure 3:
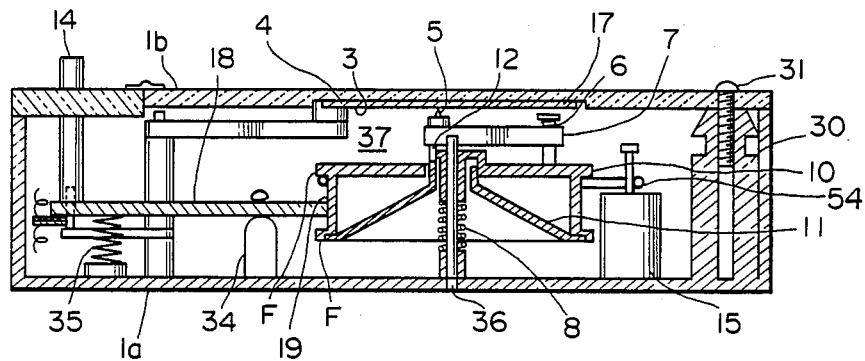
FIG. 3 is a side elevational view taken along line 3—3 of FIG. 1.
Figure 4:
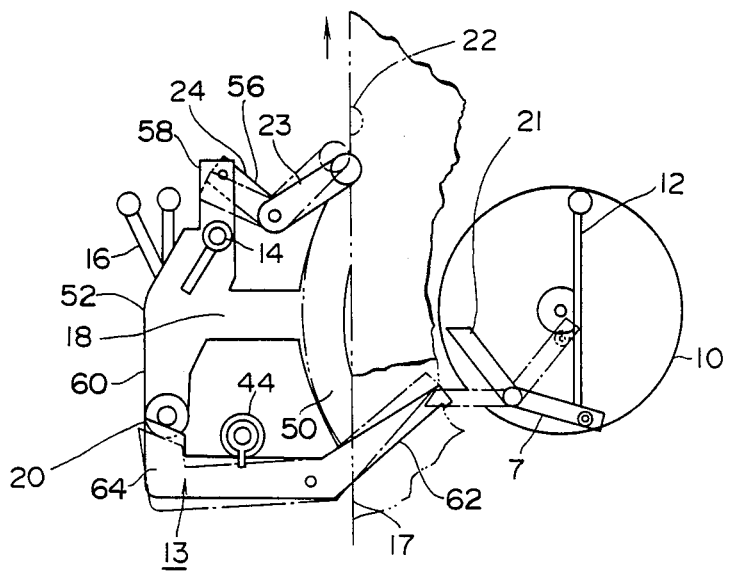
Figure 8:
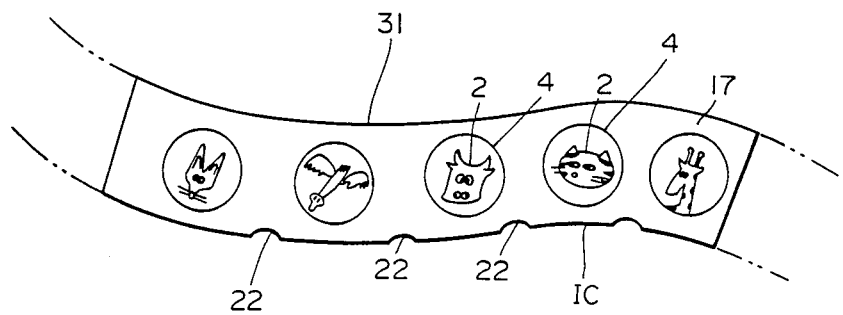
FIG. 8 is a perspective view showing an index carrier fabricated of flexible material.

As can be seen from FIGS. 1 and 8 a carrier proper 17 of an index carrier IC, shown as an entire member, is fabricated of a flexible plastic material a belt-like shape. The side peripheries thereof are formed to have a plurality of indexing points 22 being disposed equidistant from one another. Each of the indexing points 22 is formed as a notch by cutting away the side periphery of the carrier proper 17 creating an arch curved toward the center line of the carrier proper 17. The carrier proper 17 (as shown in FIG. 3) carries thereon, a plurality of record discs 4 corresponding to the number of indexing points. Each record disc bears on its lower surface a recorded face 3 and on its upper surface an indexing mark or symbol 2 indicating the recorded item, respectively. In the present embodiment, the indexing mark 2 is represented by a picture or pattern.

The side peripheral edges of the carrier proper 17 are formed to constitute a guiding or restraining portion 31, to be engaged with a track or tracks 32 formed on the index carrier magazine 80. The magazine is disposed on a casing 1 of a simplified reproducing device shown by a symbol A, so that the index carrier IC can be guided while being limited from lateral motion.

Figure 9:
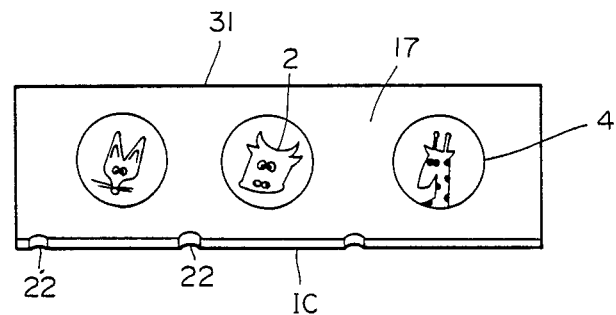
FIG. 9 is a perspective view showing an index carrier made of rigid elongated material.

FIG. 9 shows another embodiment of a carrier proper 17, made of a rigid elongated plate, which carries thereon a plurality of record discs 4. The upper face of the record disc 4 bears an indexing mark and the lower face thereof is applied with a recorded face (not shown). One side periphery of the carrier proper 17 is formed to have a plurality of indexing points 22.

The index carrier IC is loaded into a track of the simplified sound reproducing device by slidably engaging the guiding portion 31 with the track.

Figure 10:
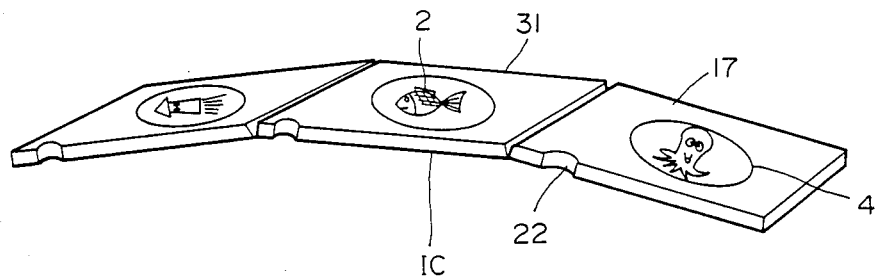
FIG. 10 is a perspective view showing an index carrier having several pieces connected by hinges so as to be folded together.

FIG. 10 shows a further embodiment as a plurality of carrier propers 17, each made of a rigid plate, coupled together by hinges. Each rigid plate carries a record disc 4. The upper face of the record disc 4 bears an indexing mark 2 and the lower face thereof is applied with a recorded face (not shown). One side periphery of the carrier proper 17 is formed to have a plurality of indexing points 22.

An index carrier IC of this type can be mounted to a simplified sound reproducing device having a track for slidably guiding it in a longitudinal direction. The remaining unplayed portions of the carrier IC can be folded and received in a suitable means for storing and convenient handling.

A sound reproducing device of the subject invention having index carrier IC is depicted in FIGS. 1 and 8.

Figure 2:
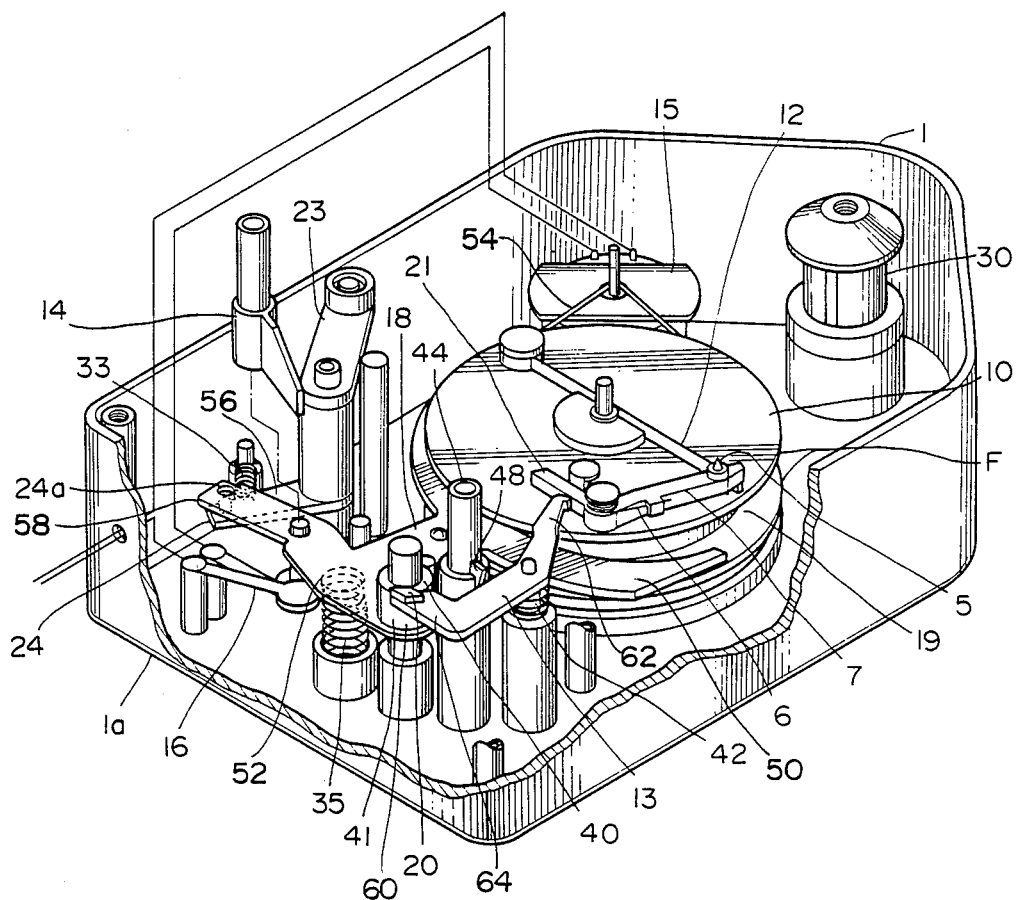
FIG. 2 is a perspective view of the simplified sound reproducing device with the cover of the casing removed and a portion of the housing broken away.

As shown in FIG. 1, a casing 1 of a simplified sound reproducing device A consists of a housing 1a and a cover lid 1b. The cover lid 1b, in this example is fabricated of a transparent plastic and may be opened or closed by means of a hinge 1c. As shown in FIG. 2, a boss or a projecting post 30 is disposed upright within the housing 1b so as to fixedly attach the cover lid 1b. A shaft 85 as shown in FIG. 1 for fixing the cover lid 1b to the housing 1a is disposed on the lower face of the cover lid 1b.

In FIG. 1 an index carrier magazine 80 which projects toward both the left side and right side of the casing 1 is fixedly attached to the cover lid 1b. The carrier 80 carries a track 32, and a transparent window 83. The window 83 covers the track 32, and spools 82, received in the aforesaid portion of the index carrier magazine 80 projecting leftward and rightward. The index carrier magazine 80, when the cover lid 1b is opened, guides the peripheral margin of the guiding portion 31 of the index carrier IC through the above-mentioned track 32. The portions of the index carrier not being used are disposed around the pair of spools at respective sides of casing 1. With the carrier 80 loaded, the cover lid 1b is closed and the shaft 85 is screw tightened to the boss 30, as shown by FIG. 1.

As is seen in FIGS. 1 and 2, a crank-like locking member 23, is disposed in the housing 1a, and is capable of being rotated in a horizontal direction. This locking member 23 is urged by a spring 33, shown in FIG. 2, so that one end of the member is normally urged toward the side periphery of the index carrier IC.

As shown in FIGS. 2 and 3, a bar 18 is disposed, so as to pivot vertically, in a seesaw-like motion, upon a fulcrum 34. One end 50 of the bar 18 is has a bifurcated curved portion, while the other end 52 includes a T-shaped portion. The T-shaped portion 52 of bar 18 is normally urged upward from the underside by a biasing means 35, such as a coil spring, and the bifurcated curved portion 50 is normally urged downward. The turn table 10, as shown particularly in FIG. 3 is rotatably supported by a center pin 36 so as to be movable, to some extent, in an axial direction, and is resiliently biased from the underside, by a stylus force spring 8. The resilient force of this stylus force spring 8 is not as strong as the force used for the bar 18.

The turn table 10 is provided, in its interior space, with a downwardly facing speaker diaphragm 11, on the top of which an acoustic cylinder 37 is disposed, being positioned to project slightly beyond the upper face of the turn table 10. As can be clearly seen from FIGS. 2 and 3, a pair of flanges F are formed on the axially upper and lower edges of the side periphery of the turn table. The opposed flanges act to form a pulley groove therebetween.

A bar-like sound transmitting member 12 is fixedly disposed above the turn table 10, and extends transversely across the turn table. One end of the bar member moves in floating manner, and the intermediate portion contacts the upper part of the acoustic cylinder 37 so as to be supported thereby.

A tone arm 7, has an upwardly facing sound reproduction stylus 5 at the upper part of one end portion. The tone arm 7 is swingably supported at its other end above the turn table 10, allowing the end having the reproduction stylus 5 to swingably travel between the outer periphery and the central part of the turn table 10. The end of the tone arm 7, beneath the reproduction stylus 5, slidably contacts the sound transmitting member 12 and is supported thereby. A return spring 6 is wound around the center pin of rotation, of the tone arm 7, so that the front portion, with the reproduction stylus 5 attached, can normally be urged toward the outer periphery of the turn table 10; namely, the starting point of sound reproduction. A cancelling means 21 is provided as an arm projecting from the center pin of rotation of the tone arm 7. This cancelling means 21 is constructed to protrude radially outwards, beyond the outer periphery of the turn table 10, when the end of the tone arm 7, provided with the stylus 5, has arrived at the central part of the turn table 10, namely, the end point of reproduction of the record disc 4.

In FIGS. 2 and 3, an electric motor 15 is coupled to the turn table 10 by means of a belt 54 extended around both the motor and the pulley groove 19.

The birfurcated end 50 of bar 18 is extended such that the pair of bifurcated legs surround the pulley groove 19. Hence, the axial movement of the end 50, in the direction of retraction, will bias flange F letting turn table 10 retract against the resilient force imparted by stylus force spring 8.

End 56 of locking member 23, formed as a crank, extends below one end 58 of the T-end 52 of the bar 18 where a male-female engaging member 24 having a projection is provided. End 58 corresponding to the projection is formed to have a small hole 24a.

When the locking member 23 engages an indexing point 22 formed as one of the notches of the index carrier IC, the male-female engaging member 24 is situated directly below the small hole 24 in end 58, enabling the male-female coupling of the two mating members upon downward movement of the end 52 of bar 18.

Figure 5:
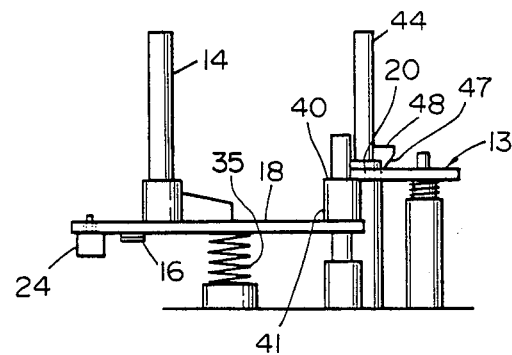
FIGS. 5 and 6, are side elevational views showing the relationship between the bar, male female engaging members, a terminating means, a holding means, an outstanding post, a stepped face, a manual terminating pusher rod or the like, when the device is in a reproduction mode or in a non-reproduction mode, respectively.
Figure 6:
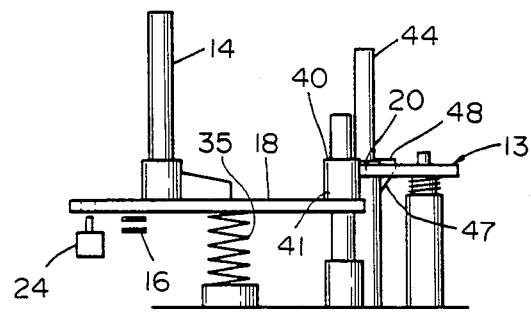
Figure 7:
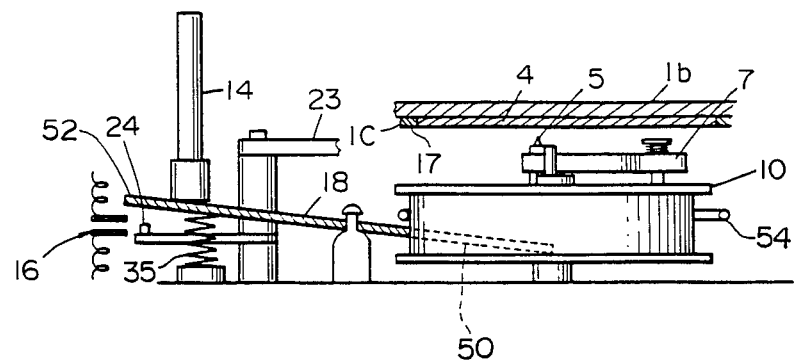
FIG. 7 is a front view showing the relationship between the turn table, the bar, the electric contact, a reproducing stylus and the like when the device is in the of non-reproduction mode.

An electric contact 16 is disposed under the T portion 52 of bar 18 and is part of an electric circuit including the electric motor 15 which, as particularly shown in FIGS. 5 through 7, is ON when the cross bar of the T-shaped end 52 of bar 18 is lowered, and is OFF when it is raised upward. The starting means, for the electric circuit, in each of the above drawings, is formed as a pusher rod 14 which contacts the end 58 of the T-shaped end 52 of the bar 18. The rod 14 moves the bar 18 downward and is activated from outside the casing 1.

The other end 66 of the cross bar of the T-shaped portion 52 of bar 18 is provided with an upstanding post 41 having an upwardly facing stepped face 40. A reproduction terminating means 13 is disposed within the housing 1a adjacent to the upstanding post 41. The reproduction terminating means 13 comprises a substantially L-shaped member, supported at an intermediate position enabling it to rotate in a horizontal direction. A means for torsionally biasing said L-shaped member 13, such as a torsion spring 42, is positioned around the supporting pin of the L-shaped member so that the member 13 is urged in a clockwise direction. One end 62 of the L-shaped member of the reproduction terminating means 13, extends slightly above the horizontal plane, and slightly outside the periphery, of the turn table 10. The other end 64 of the L-shaped member is urged by the biasing means 42 toward the side of the outstanding post 41.

A projection is fixed to the end 64 of the L-shaped member, and constitutes, in cooperation with the stepped face 40 of the upstanding post 41, a holding means 20. When the end 52 of the bar 18 descends, the holding means 20 engages the stepped face 40, retaining the end 52 in the lowered position and the other end 50 in the raised position, respectively, against the resilient force given by the biasing means 35.

In this embodiment, a manual pusher rod 44 is provided as another means for engaging the reproduction terminating means 13. This pusher rod 44 can be activated from outside the casing 1, as FIGS. 1, 3, 4, 5 and 6. The side face of the rod 44 includes a projection 48 having a downwardly facing inclined face 47. The face 47 engages the inside of the L-shaped member of the reproduction terminating means 13 and urges the lever to rotate in a counter-clockwise direction. This movement causes the turn table 10 to retract during reproduction by releasing the holding means 20, thereby lowering end 50 of bar 18. FIG. 7 shows the turn table 10 in its retracted position following operation of the cancelling means 21 or the manual terminating rod 44.

The sound reproducing device is operated when index carrier IC carrying the desired record disc 4 is loaded into the index carrier magazine 80 and is wound around the spool 82. The side margin of the guiding portion 31 is guided by being placed in contact with the track 32. The cover lid 1b is closed and fixed by shaft 85; and thereafter the index carrier IC is fed by way of winding the spool 82 through rotation of the turning knob 81, while observing the indexing mark 2 through the transparent window 83. When it is observed that the desired record disc 4 has been positioned above the turn table 10, the locking member 23, which has been resiliently contacting the side periphery of the index carrier IC, moves into the index point 11 and temporarily licks the indexing position of the record disc 4. Subsequent depressing of the pusher rod 14 will lower the end 52 of the bar 18 and raise end 50. The turn table 10 which has been retained at its retracted position is released and allowed to advance to the play position.

At the same time, the electric contact 16 which has been positioned under the end 52 of the bar 18, and is in the OFF position when the bar 18 is not depressed by the pusher rod 14, now is activated and operates the electric motor 15 so as to rotate the turn table 10.

The holding means 20 engages the stepped face 40 of the upstanding post 41, holding the bar 18 at its lowered position. The male-female engaging member 24 is inserted into the small hole 24a of bar end 58 and thereby fixes the locking member 23 into engagement with the index point 22 and thereby fixes the record disc 4 relative to the index carrier IC.

When the turn table 10 advances to the play position, the reproduction stylus 5, urged normally toward the starting point of sound reproduction, will engage the recorded face 3 of the record disc 4, tracing the recorded grooves following the rotation of the turn table. As the reproduction stylus 5 follows the recorded face 3 of the record disc 4, the stepped face 40 formed on the outstanding post 41 is kept under restriction by holding means 20 against the force of the biasing means 35.

As soon as the reproduction stylus 5 arrives at the end point of sound reproduction, the cancelling means 21 will project radially over the outer periphery of the turn table 10 striking the end 62 of the L-shaped member of the terminating means 13 causing the member to rotate and thereby release the holding means 20 from engagement with the stepped face 40 of the outstanding post 41.

When the holding means 20 has been released from engagement with the stepped face 40, the bar 18 is released from its holding action and enables the turn table 10 to be retracted, resulting in the withdrawal of the reproduction stylus 5 from the recorded face 3 of the record disc 4.

One reproduction operation can be completed in the manner as explained above, but if it is necessary to stop the reproduction during the sound reproduction, one can depress the manual pusher rod 44 so as to stop the reproduction in the same manner as if the cancelling means 21 had been actuated.

Whichever manner of termination is selected, the electric contact 16 turns OFF as shown in FIG. 7 as the reproduction stylus moves away from the recorded face 3 of the record disc 4, thereby stopping the rotation of the electric motor 15 and the turn table 10. Under this condition, the male-female engaging member 24 moves from the small hole 24a of bar end 58 allowing engaging member 24 to move rotationally, and enabling the locking member 23 to disengage from indexing point 22, and moving index carrier IC.

According to the present invention, an index carrier IC holds a plurality of record discs 4, any of which may be indexed and reproduced by moving the index carrier.

Consequently, the sound reproducing device of this invention is not only very convenient in selectively reproducing a plurality of record discs but also enables the indexing and reproducing of any item upon request, and is particularly useful as a toy or as a teaching instrument.

I claim:

1. A simplified sound reproducing device, which comprises:
   (a) a casing,
   (b) a record disc disposed in said casing, the record disc having a recorded face being directed toward the interior of said casing, the record disc having a starting point and an end point,
   (c) a turn table having an outer periphery,
   (d) a tone arm, the tone arm being disposed by the turn table, the tone arm having a sound reproducing stylus projecting toward said recorded face of said record disc and being swingable between the starting point and the end point of sound reproduction of said record disc, the tone arm being urged by a return spring toward the starting point of said sound reproduction and being urged by a stylus force spring in an axial direction.
   (e) a speaker diaphragm mounted in said turn table and with said tone arm,
   (f) a sound transmitting member in contact with the speaker diaphragm, the sound transmitting member thereby acting to transmit the reproduction vibration of said tone arm to said speaker diaphragm,
   (g) a reproduction terminating means for retracting said turn table against the stylus force spring, the reproduction terminating means having an inner end and an outer end,
   (h) a starting means for advancing said turn table by said stylus force spring,
   (i) an electric motor for driving said turn table, and
   (j) an electrical contact, said contact being capable of supplying electricity to said electric motor when said contact is actuated by said starting means, and said contact being capable of terminating the flow of electricity to said motor; and
   wherein said plurality of record discs are incorporated in an index carrier, comprising a carrier proper, a plurality of index points formed at suitable points on said index carrier corresponding to said record discs, a restraining portion for guiding said carrier proper in a specified regular direction, said casing comprising at least one track for indexing said record discs into a position where one of said record discs confronts said turn table, an index carrier magazine formed contiguous to said track and a locking member which engages said index points for indexing and locking said record disc in said position where one of said record discs confronts said turn table;
   a cancelling means disposed at a rear end position of said tone arm, the cancelling means protruding radially outward beyond the outer periphery of said turn table, said cancelling means having a plane of rotation, said sound reproduction stylus being disposed at said one end point of said sound reproduction;
   said cancelling means cooperating with said reproduction terminating means, the reproduction terminating means comprising a member horizontally swingably supported at an intermediate portion thereof, the inner end of the reproduction terminating means being located at the plane of rotation of said cancelling means protruding radially outward beyond the outer periphery of said turn table, the inner end abutting the cancelling means, an upstanding post having an upwardly facing stepped face, the outer end of the reproduction terminating means being biased onto the side of the upstanding post;
   a bar having a first end and a second end, the second end of said bar being proximate to said upstanding post, said bar being supported on a fulcrum, said bar being pivotable vertically in a seesaw-like motion, a spring biasing said second end of said bar upward thereby biasing the first end of said bar downward, an electrical contact which closes the electric circuit for said motor whenever the second end of the bar is pushed downward against said spring, said first end of the bar being able to move said turn table downward against said stylus force spring, the second end of the bar being biased and moveable upward by said spring;
   said starting means pushing down the second end of said bar which thereby raises said first end of the bar upward and enabling said turn table to move upward by said stylus force spring, the position being retainable by engaging the outer end of the reproduction terminating means with the upward facing stepped face of said upstanding post, and the position being cancellable by the engagement of the cancelling means with the inner end of the reproduction terminating means which causes rotation of the reproduction terminating means thereby disengaging the outer end of the reproduction terminating means from the upward facing stepped face of said upstanding post.

2. A simplified sound reproducing device as claimed in claim 1, wherein said carrier proper is formed as a flexible belt, said indexing points comprising notches formed on at least one side periphery of said carrier proper and said both side peripheries define said restraining portion.

3. A simplified sound reproducing device as claimed in claim 1, wherein said carrier proper is formed as an elongated rigid plate, said indexing points comprise notches formed on at least one side periphery of said carrier proper and said both side peripheries define said restraining portion.

4. A simplified sound reproducing device as claimed in claim 1, wherein said carrier proper comprises a plurality of plates connected together by hinges, each of said plates is formed to have a record disc, said indexing points comprise notches formed on at least one said periphery of said carrier proper and said both side peripheries define said restraining portion.

5. A simplified sound reproducing device as claimed in claim 1, wherein said index carrier magazine comprises a plurality of spools provided on both lengthwise sides of the carrier proper, at least one winding knob attached on each index carrier magazine, and a transparent window covering said track of said casing.

6. A simplified sound reproducing device as claimed in claim 1, wherein said index carrier magazine is attached to said casing and freely closes and opens together with said cover lid.

* * * * *